US008727182B2

(12) United States Patent
Murthy et al.

(10) Patent No.: US 8,727,182 B2
(45) Date of Patent: May 20, 2014

(54) FEEDER FOR PARTICLE DELIVERY

(75) Inventors: Vinit Satish Murthy, West Chester, OH (US); John Philip Hecht, West Chester, OH (US); Christopher Gerold Stoltz, Mason, OH (US); Christa Marie Novicki, Clay Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 211 days.

(21) Appl. No.: 13/033,807

(22) Filed: Feb. 24, 2011

(65) Prior Publication Data

US 2012/0217269 A1 Aug. 30, 2012

(51) Int. Cl.
*B67D 7/84* (2010.01)

(52) U.S. Cl.
USPC ........... 222/162; 222/168; 222/333; 222/410; 222/504

(58) Field of Classification Search
USPC ................ 222/160, 162, 167–168, 333, 410, 222/460–462, 504, 185.1; 464/160
See application file for complete search history.

(56) References Cited

U.S. PATENT DOCUMENTS

| | | | |
|---|---|---|---|
| 2,593,535 A * | 4/1952 | Cannon, Jr. | 414/301 |
| 3,909,068 A | 9/1975 | Coucher | |
| 3,964,648 A * | 6/1976 | Suzuki et al. | 222/333 |
| 4,273,266 A | 6/1981 | Snape | |
| 4,350,292 A | 9/1982 | Gilbert et al. | |
| 4,785,976 A | 11/1988 | Bennie et al. | |
| 4,793,525 A * | 12/1988 | Kaufmann | 222/333 |
| 4,821,782 A | 4/1989 | Hyer | |
| 4,828,448 A | 5/1989 | Skeath | |
| 4,913,320 A * | 4/1990 | Stazhevsky et al. | 222/168 |
| 4,919,320 A * | 4/1990 | Storace | 227/19 |
| 5,145,009 A * | 9/1992 | Mheidle et al. | 141/83 |
| 5,738,249 A | 4/1998 | Kikuchi et al. | |
| 5,791,526 A * | 8/1998 | Landais et al. | 222/185.1 |
| 5,947,169 A * | 9/1999 | Wegman et al. | 141/71 |
| 6,257,447 B1 | 7/2001 | Schlienger et al. | |
| 6,550,640 B2 * | 4/2003 | Smith | 222/1 |

(Continued)

FOREIGN PATENT DOCUMENTS

| | | |
|---|---|---|
| CA | 2314028 AA | 1/2002 |
| DE | 2951300 A1 | 7/1981 |

(Continued)

OTHER PUBLICATIONS

International Search Report dated Mar. 30, 2012, 6 pages.

*Primary Examiner* — Paul R Durand
*Assistant Examiner* — Andrew P Bainbridge
(74) *Attorney, Agent, or Firm* — Jeffrey V. Bamber; Kim W. Zerby

(57) ABSTRACT

A feeder apparatus includes a hopper having a longitudinal axis and a wall having an external surface and an internal surface defining a thickness therebetween. The wall defines an infeed end for receipt of particulate material and an outfeed end for conveyance of the particulate material from the hopper. The outfeed end defines or has an outfeed aperture therein. A base disposed such that at least a portion of the base is substantially coextensive with the outfeed aperture. The base has at least one base aperture therethrough to facilitate conveyance of the particulate material from the hopper. The base aperture may be concentrically or eccentrically disposed relative to the longitudinal axis of said hopper. At least one of the base and the hopper is capable of rotation relative to another of the base and hopper, such that the base aperture is in at least intermittent in particulate flow communication with the outfeed aperture.

22 Claims, 15 Drawing Sheets

(56) References Cited

U.S. PATENT DOCUMENTS

| | | | |
|---|---|---|---|
| 7,090,098 B2 * | 8/2006 | Livingston et al. | 222/651 |
| 7,674,076 B2 | 3/2010 | Van Steenkiste et al. | |
| 2005/0175397 A1 | 8/2005 | Chen | |
| 2006/0247122 A1 | 11/2006 | Kodas et al. | |
| 2008/0014031 A1 * | 1/2008 | Steenkiste et al. | 406/52 |

FOREIGN PATENT DOCUMENTS

| | | |
|---|---|---|
| DE | 20303470 U1 | 7/2003 |
| EP | 0241982 A1 | 10/1987 |
| EP | 0776829 A1 | 6/1997 |
| EP | 1440729 A4 | 9/2006 |
| EP | 1953087 A1 | 8/2008 |
| EP | 1270464 B1 | 9/2009 |
| EP | 2127573 A1 | 12/2009 |
| FR | 1489157 A | 7/1967 |
| FR | 2790247 A1 | 9/2000 |
| JP | 11254329 A | 9/1999 |
| SU | 598822 A1 | 3/1978 |
| WO | WO-96/41761 A1 | 12/1996 |

* cited by examiner

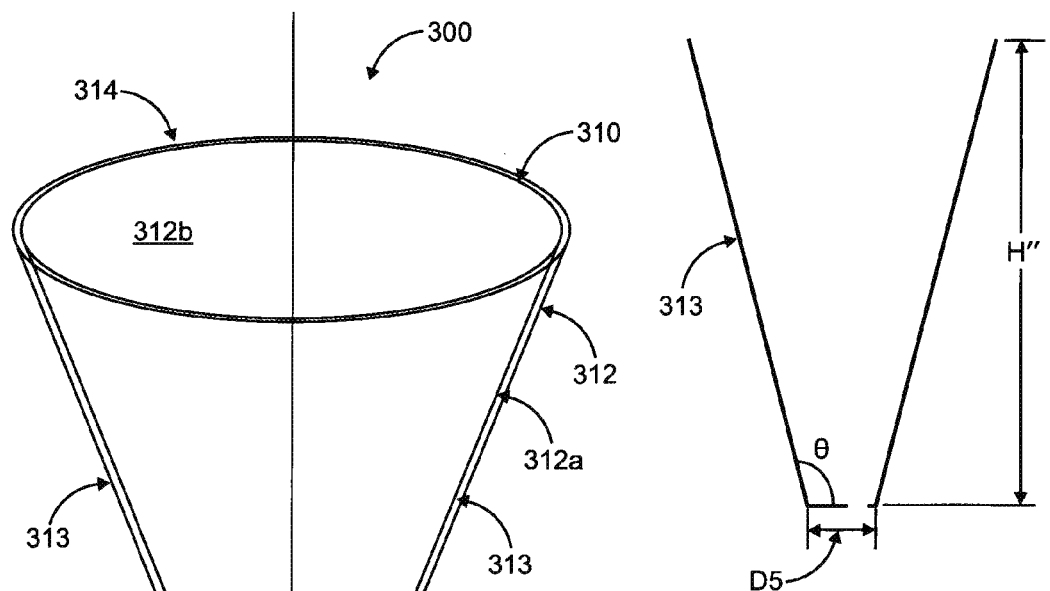
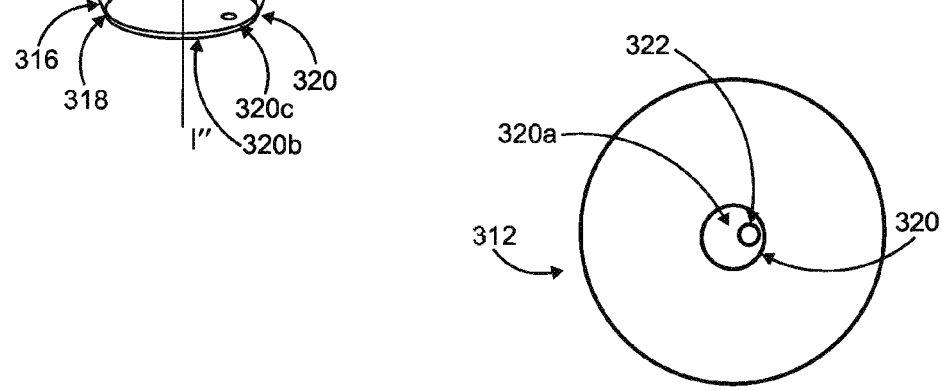
FIG. 5
FIG. 5A
FIG. 5B

Time = 0 Seconds 2000
3000
2000

Time = 10 Seconds

Time = 20 Seconds

Time = 35 Seconds 2000
3000

Time = 50 Seconds

2000

Time = 0 Seconds

Time = 10 Seconds

Time = 20 Seconds

Time = 35 Seconds

Time = 50 Seconds

FEEDER FOR PARTICLE DELIVERY

FIELD OF THE INVENTION

The present disclosure is directed to an apparatus for controlling the flow of powdered and granular materials during an industrial process. More particularly, the present disclosure is directed to the employment of rotational motion to predictably affect the flow of particulate materials from a hopper.

BACKGROUND OF THE INVENTION

Particulate materials, powders and bulk solids (collectively referred to hereinafter as "comminuted materials" or "bulk materials") are widely used in the processing of a variety of particles, powders and particulate solids, including but not limited to those used in foods and food additives, pharmaceuticals, chemicals, minerals, detergents, paints, cement, powdered metals, plastics and cosmetics (the terms "particles", "powders", "particulate solids", and "particulate materials" are used interchangeably herein). In a production operation involving particulate materials, successful handling, storage and flow of such materials is an important part of overall plant design. Assurance of an even flow of particulate materials between the process stages is sought, with minimum alteration in the quality of the stored product. Since particulate solids that are stored and/or move in mass quantities depend on both individual particles and inter-particle interactions, it is desirable for plant designs to provide reliable flow of powders and other bulk materials.

Throughout the process industries, hoppers and receptacles are used extensively for the storage and transfer of bulk solids. Flowability of a material, however, may change depending on the condition of the stored material and type of hopper structure (including the hopper's material composition). The flow can be funnel flow (defined as flow from a hopper in which all particulate movement occurs through a central core above the hopper outfeed aperture with no movement occurring along all or part of the hopper wall, as illustrated in FIG. 1) or mass flow (defined as flow from a hopper in a manner such that all of the material is in motion and movement occurs along all of the hopper wall, as illustrated in FIG. 2). As illustrated in FIG. 1, funnel flow is realized when a hopper 10 has an interior wall surface 12 that is too shallow or too rough for the smooth passage of bulk material thereagainst. Consequently, material falls preferentially through a funnel-shaped channel 14 located directly above a hopper outfeed aperture 16 while material outside of this flow is stagnant, resulting in first-in last-out flow behavior.

Common drawbacks associated with funnel flow in hoppers include rat holing, segregation, stagnation, avalanching and arching in the proximity of the outfeed aperture. This behavior leads to particle spoilage, product deterioration, safety hazards, sanitary issues and equipment damage. A variety of solutions have been proposed to overcome defects inherent in funnel flow behavior, including hammering or vibration of the hopper and material stored therein or alternatively by using flow corrective inserts. Such corrective methods, however, are ineffective for cohesive materials that are sensitive to over-compaction. In addition, impellers disposed within a hopper can be employed to scrape interior hopper walls for extraneous particulate material. Such impellers, however, require extensive design, construction and maintenance in order to ensure uninterrupted particle flow.

It is therefore desirable to provide a feeder that effects mass flow of particulate materials in a predictable and controllable manner, so as to provide controllable flow rates. Such a feeder configuration achieves first-in first-out flow behavior for a wide array of particles.

SUMMARY OF THE INVENTION

According to an aspect of the disclosure, a feeder apparatus effects flow conveyance of particulate material from a hopper. The particulate material may be conveyed to a receptacle such as a conduit or container. The feeder apparatus includes a hopper that facilitates receipt and storage of the particulate material. The hopper has a longitudinal axis (or vertical axis) defined along a wall of predetermined height, with the wall having an external surface and an internal surface defining a predetermined thickness therebetween. The wall defines (or is coexistent with) an infeed end for receipt of the particulate material in the hopper and an outfeed end for conveyance of the particulate material from the hopper to the receptacle. The outfeed end defines or has an outfeed aperture therein. A base is disposed adjacent to and below the outfeed aperture so that at least a portion of the base is substantially coextensive with the outfeed aperture. That is, the base substantially covers and blocks particulate material from flowing out of the outfeed aperture (other than through the base aperture). The base has an upper surface, a lower surface and an edge defining a predetermined thickness thereby. The base can be in any suitable configuration including, but not limited to in the configuration of a disk. The base has at least one base aperture defined therethrough to facilitate conveyance of the particulate material from the hopper to the receptacle. The base aperture can be eccentrically disposed relative to the longitudinal axis of said hopper or concentrically disposed relative to the base. At least one of the base and the hopper are capable of rotation through multiple revolutions relative to another of the base and hopper. The rotation may be continuous until it is desired to stop the rotation. Rotation is effected relative to an axis of rotation that may be parallel to and/or coincident with the longitudinal axis of the hopper such that the base aperture is at least in intermittent particulate flow communication with the outfeed aperture. In some embodiments, the base aperture may be in continuous registry with a portion of a larger sized outfeed aperture.

The hopper wall may comprise one of many geometries, including cylindrical and conical geometries. Alternatively, the outfeed end of the hopper may include one of a frustoconical portion and a conical portion terminating in an outfeed aperture.

The continuous rotation realized by the feeder apparatus hopper can be effected by an actuating means such as a servo motor. The actuator can be a motor coupled with a driveshaft that imparts rotational motion to the base. Alternatively, a motor can be operatively coupled with the hopper such that the hopper wall rotates relative to a stationary base and the particulate material escapes through base aperture thereof to a receptacle.

The base aperture can comprise one of several geometries, including a cylindrical bore, an elliptical aperture and multiple apertures. Alternatively, the base aperture may be substantially sector shaped with an arc at or close to the edge of the base.

The disclosed feeder apparatus is designed to provide predictable and repeatable powder flow control. In the disclosed configuration, the granular flow rate can be controlled and predictably increased/decreased by rotating the base or the hopper wall at various speeds. Mass flow, in many instances, can be accomplished.

Various other advantages and features of the present invention will become readily apparent from the following detailed description.

BRIEF DESCRIPTION OF THE DRAWINGS

While the specification concludes with claims particularly pointing out and distinctly claiming the invention, it is believed that the embodiments will be better understood from the following description in conjunction with the accompanying figures, in which:

FIG. 5 is a perspective view of another exemplary feeder.

FIG. 5A is a schematic front view of the feeder shown in FIG. 5.

FIG. 5B is a schematic top view of the feeder shown in FIG. 5.

FIG. 6A is a schematic front view of the feeder shown in FIG. 6.

DETAILED DESCRIPTION OF THE INVENTION

Figures 3, 3A, 3B:
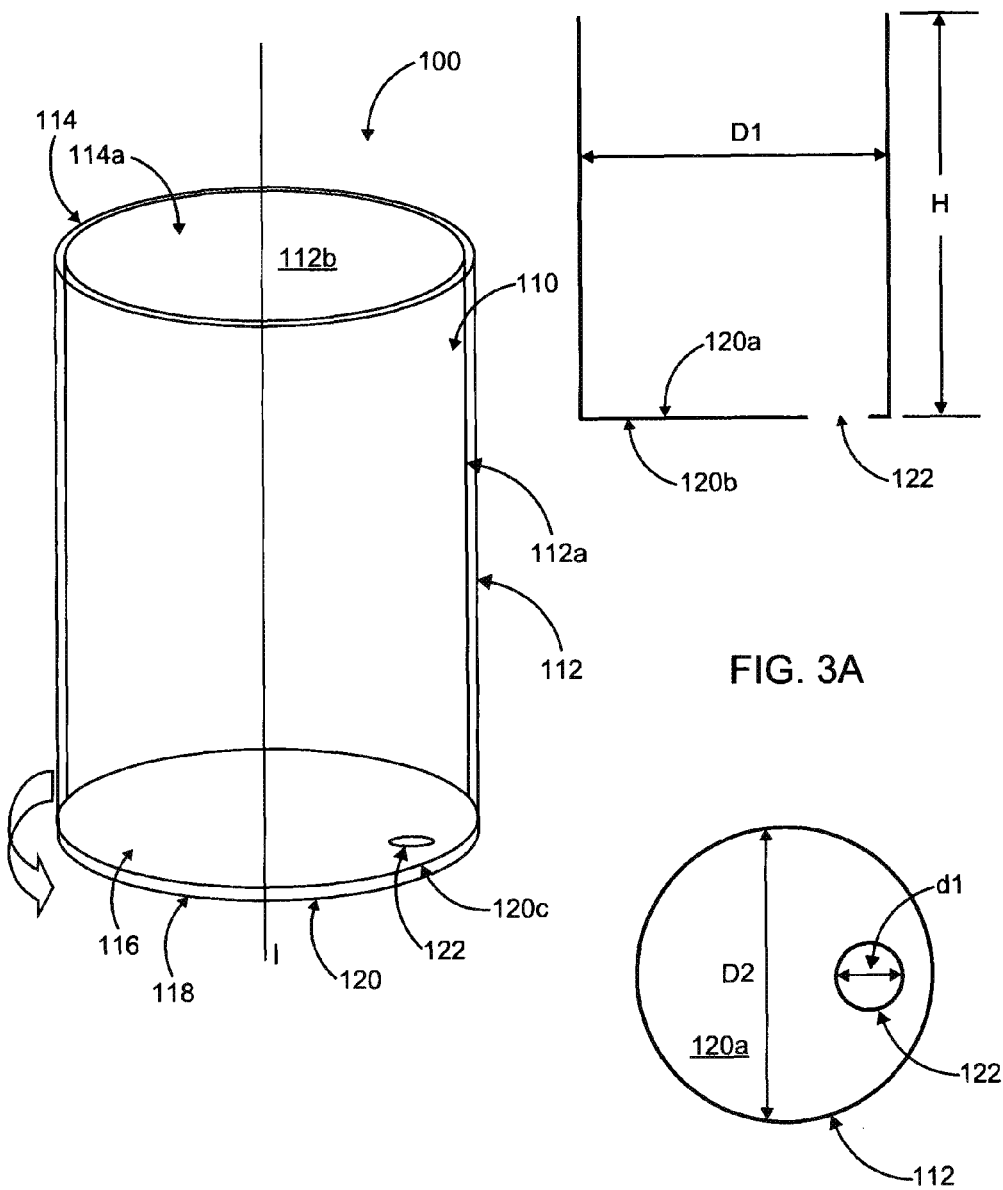
FIG. 3 is a perspective view of an exemplary feeder.
FIG. 3A is a schematic front view of the feeder shown in FIG. 3.
FIG. 3B is a schematic top view of the feeder shown in FIG. 3.

Now referring to the figures, wherein like numbers identify like elements, FIGS. 3, 3A and 3B show perspective, front and top views, respectively, of a feeder 100 according to an embodiment of the presently disclosed feeder. Feeder 100 includes a hopper 110 in which particulate material is received and stored until subsequent conveyance of the material to a receptacle (not shown) for further processing. Hopper 110 has a wall 112, wherein wall 112 includes an external surface 112a and an internal surface 112b defining a predetermined thickness therebetween. Thickness is dependent upon the selection of hopper geometry (as further described hereinbelow) and material composition of hopper 110. Hopper wall 112 is coextensive with an open infeed end 114 having an infeed aperture 114a through which particulate material is deposited into the hopper and an open outfeed end 116 having an outfeed aperture 118 through which material exits the hopper via the base aperture.

Hopper wall 112 is shown herein as a generally cylindrical member having a longitudinal axis 1 and a predetermined inner diameter $D_1$ and predetermined height H. Such configuration permits an increased hopper storage volume as compared with commercial hoppers that require a steep conical section to enable reliable particle discharge. The extra volume between a frustum shape and a cylinder is thereby gained when using this configuration to optimize use of available space within a production plant. It is, however, understood that the hopper wall can assume various geometries for successful practice of the feeder, as further described hereinbelow.

Feeder 100 further includes a base 120 rotatably disposed adjacent outfeed aperture 118. The base 120 may be of any suitable size and configuration. For example, the base 120 may be sized and configured to be located in either of the following locations: circular and sized to fit completely inside the cylindrical opening defined by the outfeed aperture 118; or, below the outfeed aperture 118 and larger in size than the outfeed aperture 118. As shown herein, base 120 includes an upper surface 120a disposed proximate outfeed aperture 118, an opposed lower surface 120b and an edge 120c defining a predetermined thickness thereby. Edge 120c delineates a perimetrical extent of base 120 and is advantageously positioned adjacent outfeed aperture 118 of hopper 110 such that base 120 essentially obstructs flow of particulate materials from the hopper. When hopper wall 112 assumes a cylindrical configuration as shown, base 120 has a predetermined diameter $D_2$ such that edge 120c is disposed rotatably adjacent inner surface 112b of hopper wall 112. Base 120 is generally rotatable about an axis coincident with longitudinal axis 1 of hopper wall 112 such that base edge 120c moves relative to inner surface 112b at outfeed end 116. Upon rotation of base 120 relative to hopper wall 112, exiting powder exhibits a flow discharge pattern that avoids formation of a slope at an upper surface of the powder. This discharge behavior reduces the tendency for percolation segregation.

Base 120 has at least one base aperture 122 defined therethrough and eccentrically disposed adjacent edge 120c. Base aperture 122 is shown as a generally cylindrical hole having a predetermined diameter $d_1$ defined by a straight wall surface (i.e., the wall surface is not inclined, beveled or otherwise formed to include one or more aperture wall angles). It is understood, however, that base aperture 122 may assume any geometry amenable to the successful practice of the feeder and may be disposed concentrically relative to base 120. Alternatively, base aperture 122 may be substituted with two or more apertures of varying geometry.

The hopper 110 and base 120 can be made out of any suitable material(s), including but not limited to metals and/or plastics. The hopper 110 and base 120 may be made of the same material, or of different materials. For instance, the hopper 110 may be made of plastic and the base 120 may be made of steel. The base 120 is provided with a suitable shaft about which it rotates and a bearing system which may be of a type known in the art to ensure that the base has as little tendency to wobble as possible when it rotates. In addition, the hopper 110 may be provided with a gasket at the bottom thereof to reduce any tendency for particulate material to accumulate between the bottom of the hopper 110 and the base 120. The gasket may, for example, comprise a hoop-like ring of material that is added to the bottom of the walls of the hopper 110. The gasket may be made of any suitable material including, but not limited to: felt, durable plastic (e.g., DEL-RIN®), or brass. The gasket may be in direct contact with the base 120. Typically, the gasket will be made of a softer material than the base 120, so that any wear during use will occur to the gasket, rather than to the base 120.

Figure 1:
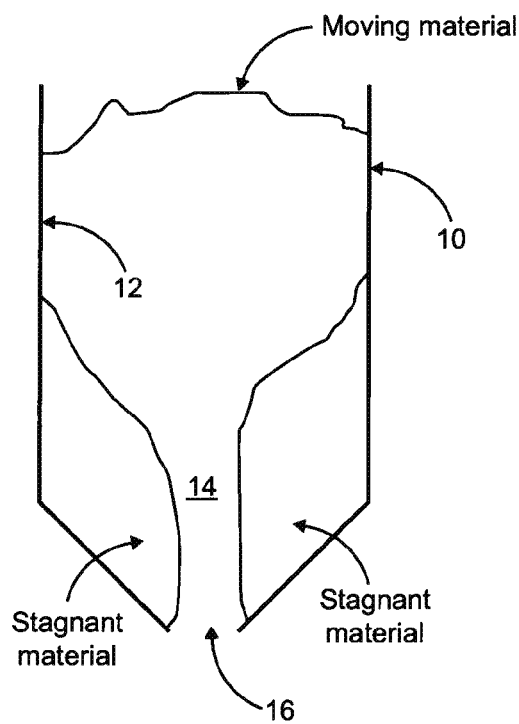
FIG. 1 shows a schematic representation of funnel flow in a hopper having particulate materials stored therein.
Figure 2:
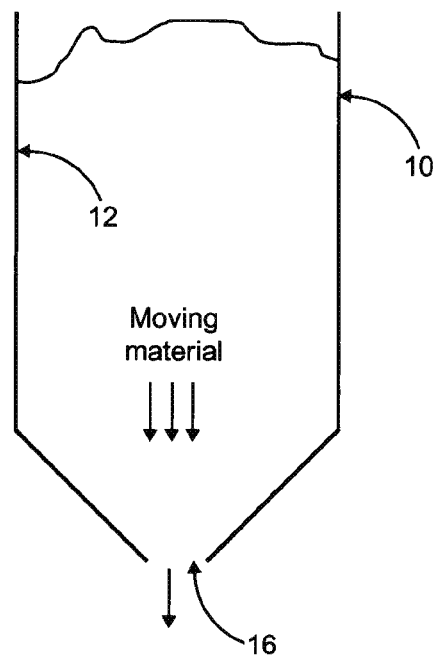
FIG. 2 shows a schematic representation of mass flow in a hopper having particulate materials stored therein.

During rotational movement of base 120, base aperture 122 remains in particulate flow communication with (for example, registry with a portion of) the outfeed aperture 118 to provide controlled release of particulate material from the hopper. The phrase "particulate flow communication", as used herein, simply means that particles can flow, such as by gravity, from the outfeed end of the hopper through the base aperture 122. The particulate material may be conveyed to a receptacle such as a conduit or container. As base 120 rotates relative to hopper 110, particulate flow through base aperture 122 assumes a first-in first-out flow behavior such as that illustrated in FIG. 2. Although base 120 is shown as rotatable in a counterclockwise direction as indicated by the arrow in FIG. 3, it is understood that base 120 can also rotate in a clockwise direction.

Feeder 100 realizes a time consolidation benefit over traditional powder storage vessels in which the largest stresses on powders occur at a junction between a vertical section and a converging hopper section. When rotating base 120 is used with a cylindrical hopper 110, no such junction exists and corresponding stresses are thereby reduced.

For particulate materials to slide on a surface, friction between the particles and the surface must be overcome. Thus, for some particulate materials stored in a hopper, it may be necessary to alter the hopper wall geometry to be sufficiently steep and smooth so as to force sliding of the material therealong. For a given particulate material, wall friction can be affected by factors including, but not limited to, wall material, temperature of the wall and bulk material, changes in moisture of the bulk material, corrosion of the hopper material, abrasive wear of the hopper and the duration of a material's retention in the hopper prior to dispersal therefrom (as some bulk materials adhere to wall surfaces while remaining at rest). The feeder of the present disclosure thereby accommodates a variety of particulate materials by accommodating dispersion thereof from a variety of hopper geometries.

Figures 4, 4A, 4B:
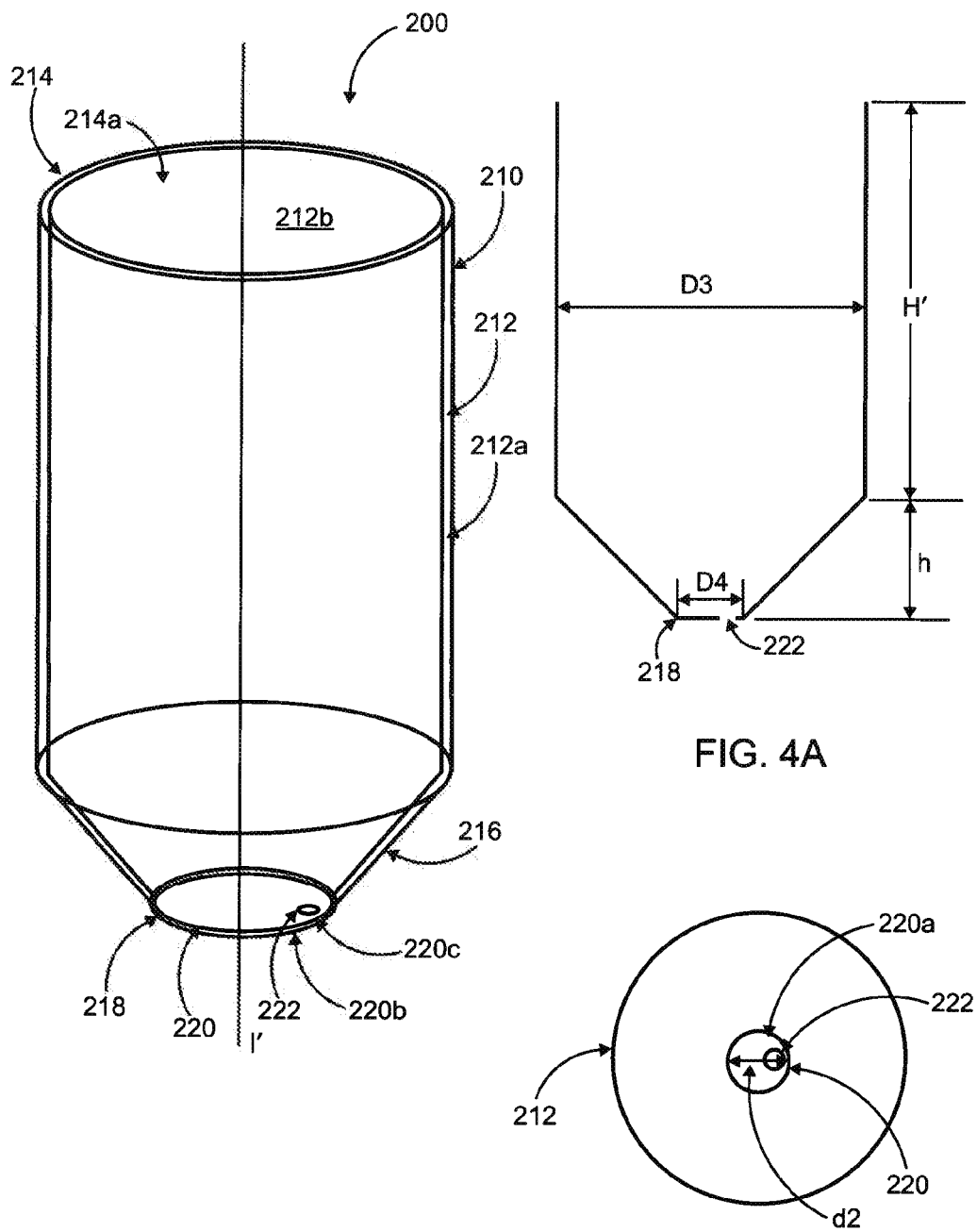
FIG. 4 is a perspective view of another exemplary feeder.
FIG. 4A is a schematic front view of the feeder shown in FIG. 4.
FIG. 4B is a schematic top view of the feeder shown in FIG. 4.

In an embodiment shown in FIGS. 4, 4A and 4B, a feeder 200 has a hopper 210 with a wall 212 including an external surface 212a and an internal surface 212b defining a predetermined thickness therebetween. Hopper wall 212 is coextensive between an open infeed end 214 having an infeed aperture from 214a through which particulates are fed into the hopper and an opposed open outfeed end 216 having an outfeed aperture 218 defined thereat for conveyance of the particulate materials from the hopper. A portion of hopper wall 212 proximate infeed end 214 assumes a generally cylindrical configuration having a predetermined height H' whereby inner surface 212b delineates an inner diameter $D_3$. A portion of hopper wall 212 proximate outfeed end 216 assumes a generally frustoconical configuration having a predetermined height h terminating in outfeed aperture 218 having a predetermined diameter $D_4$. A longitudinal axis 1' is defined along an entire length of wall 212 along heights H' and h.

A base 220 that is rotatably disposed adjacent outfeed aperture 218 includes an upper surface 220a disposed proximate outfeed aperture 218, an opposed lower surface 220b and an edge 220c defining a predetermined thickness thereby. Edge 220c delineates a predetermined diameter $d_2$ of base 220 and is advantageously positioned adjacent outfeed aperture 218 of hopper 210 so as to be coextensive with a diameter $D_4$ thereof. Base 220 is rotatable about an axis coincident with longitudinal axis 1' of hopper wall 212 such that base edge 220c moves relative to inner surface 212b at outfeed end 216. Base 220 has at least one base aperture 222 defined therethrough and eccentrically disposed adjacent edge 220c. Base aperture 222 is generally a cylindrical bore having a predetermined diameter although base aperture 222 can assume any other geometry amenable to practice of the presently disclosed feeder or may alternatively comprise two or more apertures similarly disposed. Base aperture 222 may alternatively be disposed concentrically relative to base 220. Base 220 is rotational relative to hopper outfeed end 218 along an axis of rotation that is generally coincident with longitudinal axis 1' such that base edge 220c moves relative to inner surface 212b at outfeed end 216. Base aperture 222 therefore remains in registry with outfeed aperture 218 to provide controlled release of particulate material to a receptacle (not shown).

In an embodiment shown in FIGS. 5, 5A and 5B, a feeder 300 has a hopper 310 provided with a generally conical wall 312 having a predetermined height H". Hopper wall 312 including an external surface 312a and an internal surface 312b defining a predetermined thickness therebetween. Hopper wall 312, being coextensive with an open infeed end 314 and an open outfeed end 316, includes sloped wall portions 313 of predetermined hopper angle θ that terminate at an outfeed aperture 318 having a predetermined diameter $D_5$. A longitudinal axis 1" is defined along an entire length of wall 312 along height H". A base 320 having an upper surface 320a, an opposed lower surface 320b and an edge 320c defining a predetermined thickness thereby is rotatably disposed such that base upper surface 320a is positioned adjacent outfeed aperture 318. Base 320 is rotatable about an axis of rotation coincident with longitudinal axis 1". A base aperture 322 defined through base 320 is disposed eccentrically of the axis of rotation and may alternatively comprise a single aperture or multiple apertures that remain in registry with outfeed aperture 318. Alternatively, base aperture 322 may be disposed concentrically relative to base 320. Either configuration will provide controlled release of particulate material to a receptacle.

The disclosed feeder configurations contemplate equivalent configurations such as those embodying a stationary base disposed adjacent and outfeed end of a rotatable hopper. In either configuration (stationary hopper with rotating base, or rotating hopper with stationary base), the base aperture may remain eccentrically disposed relative to the axis of rotation yet in registry with the outfeed aperture to ensure mass flow of the particulate material from the hopper. Such flow behavior imparts predictability and reliability to processing operations. In some embodiments, increased flow is observed even if the base aperture is in alignment with the hopper's longitudinal axis (such that a generally cylindrical aperture would be concentrically disposed relative to an annular base). The motion of the base provides sufficient agitation to the particulate material to result in a higher flow rate thereof through the moving base aperture.

Figures 6, 6B:
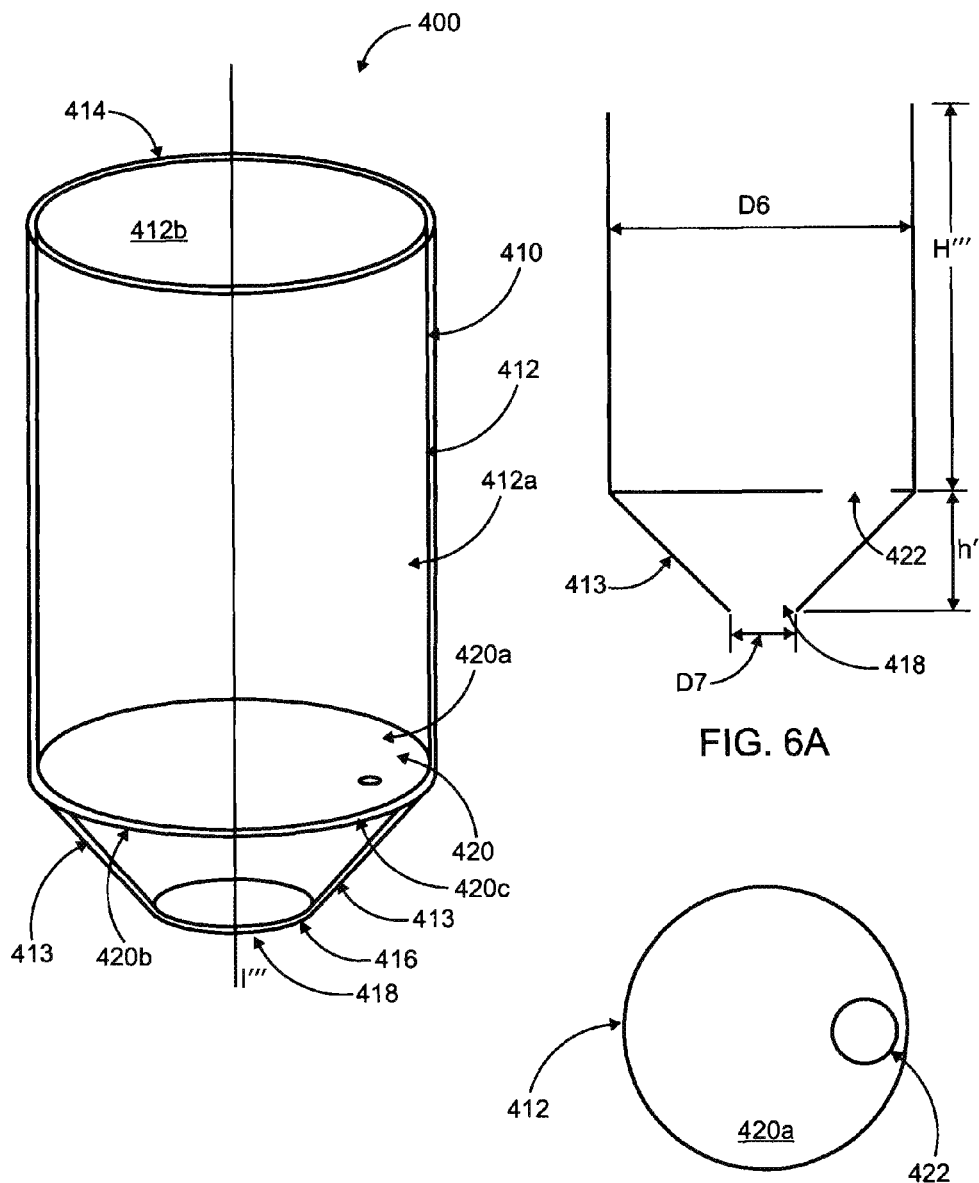
FIG. 6 is a perspective view of another exemplary feeder.
FIG. 6B is a schematic top view of the feeder shown in FIG. 6.

Now referring to FIGS. 6, 6A and 6B, another feeder embodiment is provided. Feeder 400 includes a hopper 410 having a wall 412 with an external surface 412a and an internal surface 412b defining a predetermined thickness therebetween. Hopper wall 412 is coextensive with an open infeed end 414 and an open outfeed end 416. A portion of hopper wall 412 proximate infeed end 414 assumes a generally cylindrical configuration having a predetermined height H" whereby inner surface 412b delineates an inner diameter $D_6$. A portion of hopper wall 412 proximate outfeed end 416 assumes a generally conical configuration having a predetermined height h' and sloped wall portions 413 terminating in outfeed aperture 418 with predetermined diameter $D_7$. A longitudinal axis 1'" is defined along an entire length of wall 412 along heights H" and h'.

A base 420 that is rotatably disposed within hopper wall 412 includes an upper surface 420a facing infeed end 414, an opposed lower surface 420b facing outfeed end 416 and an edge 420c defining a predetermined thickness thereby. Base 420 is rotatable about an axis coincident with longitudinal axis 1'" of hopper wall 412 such that base edge 420c moves relative to inner surface 412b. Base 420 has at least one base aperture 422 defined therethrough and eccentrically disposed adjacent edge 420c. Base aperture 422 is generally a cylindrical bore having a predetermined diameter (although base aperture 422 can assume any other geometry amenable to practice of the presently disclosed feeder or may alternatively comprise two or more apertures similarly disposed). In this configuration, base aperture 422 remains eccentrically disposed of the axis of rotation although base aperture 422 need not remain in registry with outfeed aperture 418. As particulates traverse aperture 418 in a mass flow behavior, the particulates are evenly dispersed along a surface area of sloped wall portions 413 as base 420 completes a full rotation. The particles are thereby conveyed to a receptacle (not shown) in a controlled flow such that obstruction of outfeed aperture 418 is obviated.

Figures 7, 7A:
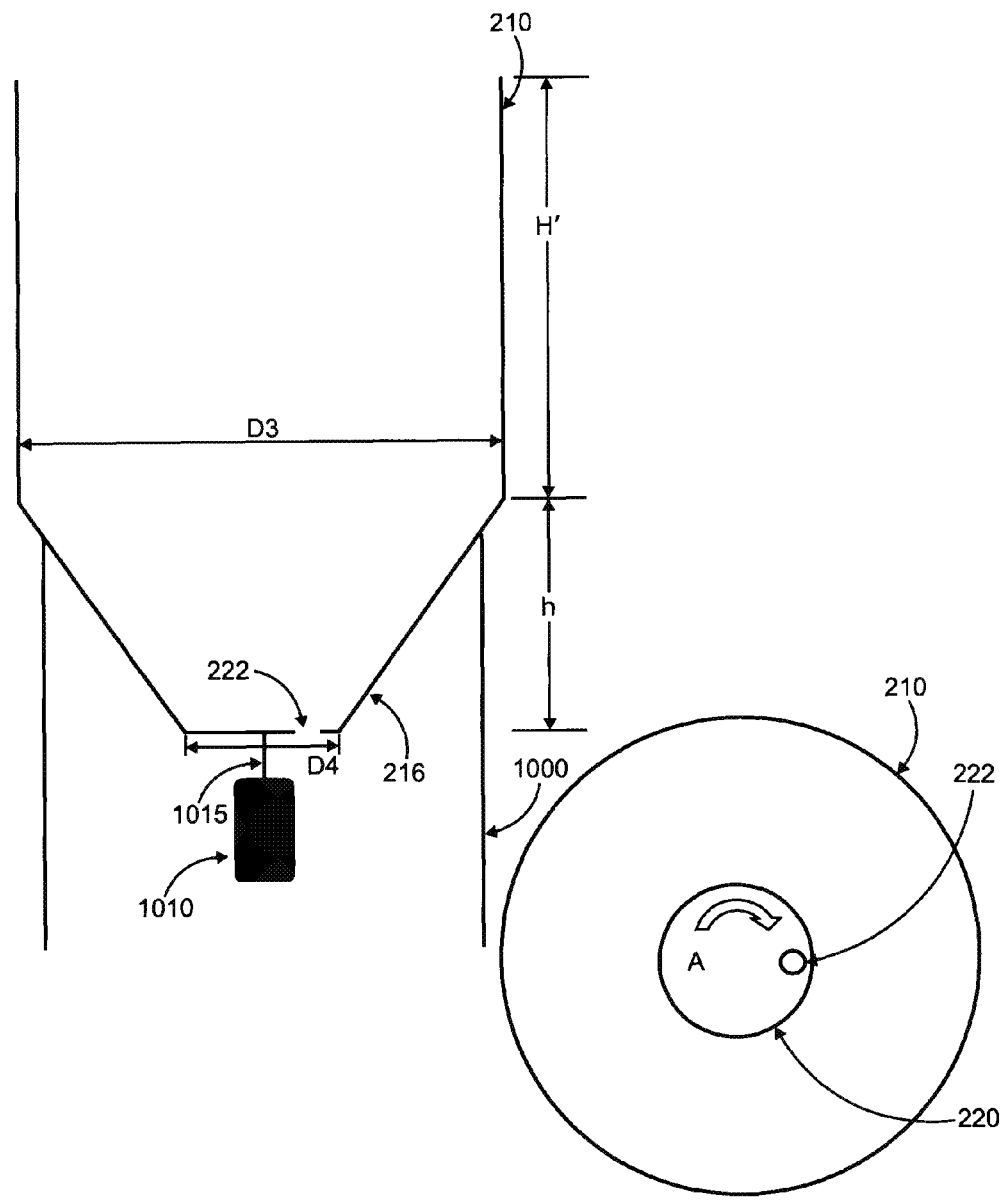
FIG. 7 is a schematic front view of the exemplary feeder of FIG. 4 having a motor driven shaft.
FIG. 7A is a schematic top view of the feeder shown in FIG. 4.

Now referring to FIGS. 7 and 7A, a feeder such as the type shown in FIG. 4 is supportable by a support 1000, which support may be a container for receipt of particulate material from outfeed end 216. In the alternative, support 1000 may be a chute or equivalent conduit that directs particulate material from outfeed end 216 of hopper 210 to an appropriate receptacle for further processing. As illustrated in FIG. 7, an actuator device such as a motor 1010 effects rotation of base 220 relative to hopper 210. With particular reference to FIG. 7A, motor 1010 effects rotation of base 220 (and likewise base aperture 222) in the direction of arrow A (although rotation is shown as being effected in a clockwise direction, it is understood that counterclockwise rotation may also be effected without departing from the scope of the disclosure). Motor 1010 translates rotational motion to base 220 via a driveshaft 1015 in communication therewith. Motor 1010 may comprise one or more electrically-powered servo motors or at least one battery or fuel-powered generator as is known. As illustrated, driveshaft 1015 may be detachably affixed to base 220 so as to be coincident with the base's axis of rotation and thereby reduce vibratory disturbances. Although motor 1010 is shown as a motor driving base 220 directly from a bottom surface thereof, it is understood that an actuator device used to effect rotation can include one or more motors or transmission devices that translate rotational motion to a hopper wall (for instance, in the case where an infeed wall portion is separable from an outfeed wall portion, one wall portion may be rotatable with respect to the other wall portion and/or to the base). It is also understood that rotation can be effected via actuator means in actuatable communication with the rotatable base along any surface thereof (for example, via a drive shaft attachable to a top surface of the rotatable base). The presently disclosed feeder anticipates the incorporation of many types of driving means to effect rotatable movement as is known in the art.

Figure 16:
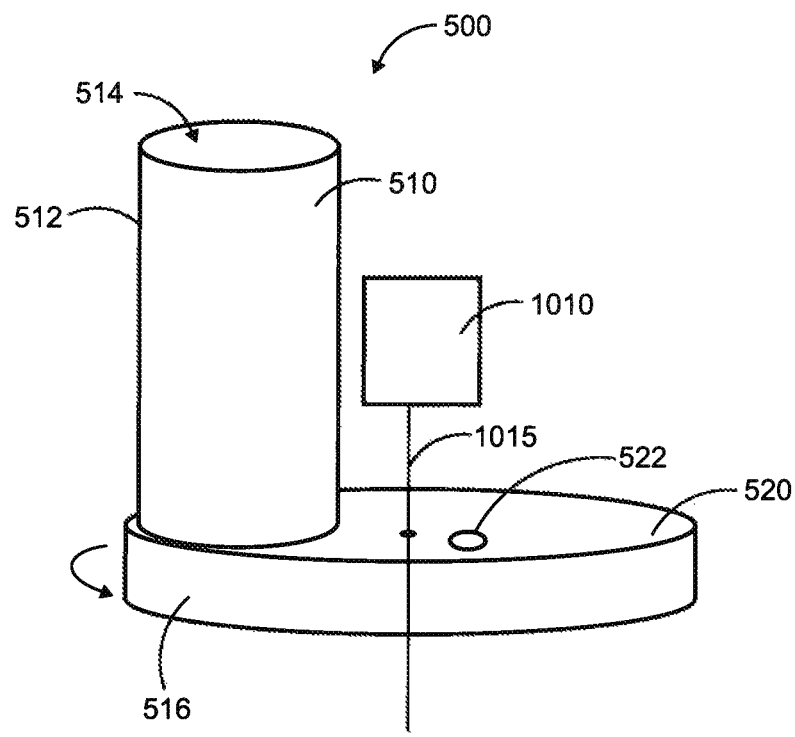
FIG. 16 is a perspective view of another exemplary feeder with a motor.
Figure 16A:
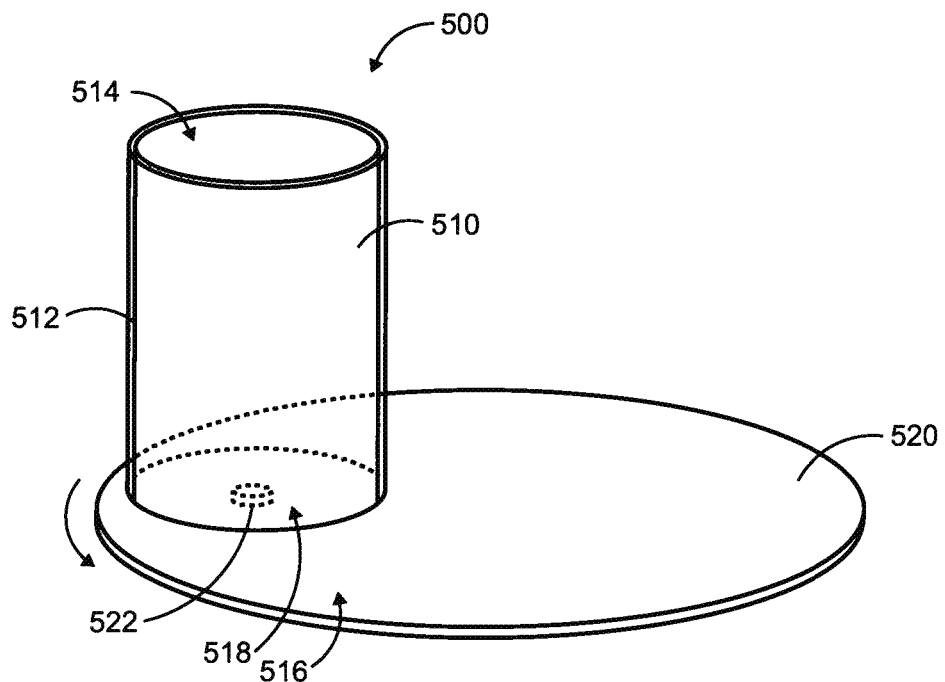
FIG. 16A is another perspective view of the feeder shown in FIG. 16 without the motor showing the base rotated so that the base aperture is aligned with the outfeed aperture of the hopper.

FIGS. 16 and 16A show another embodiment of a feeder 500. The apparatus shown in FIGS. 16 and 16A may have all of the same components of the feeders shown in the prior drawing figures. Thus, the feeder 500 has a hopper 510 provided with a wall 512, an infeed end 514, an outfeed end 516 with an outfeed aperture 218, and a base 520 having a base aperture 522 therein. The feeder 500 may further comprise an actuator device such as a motor 1010 that effects rotation of the base 520 via a driveshaft 1015.

In this embodiment, however, the base is larger than the outfeed end 516 of the hopper. The base 520 is sufficiently large that its center of rotation is non-coincident with the longitudinal axis of the hopper 510. More specifically, in the embodiment shown, the center of rotation of the base 520 lies laterally outside of the hopper 510. In this embodiment, the rotation of the base 520 is about an axis that is parallel to the longitudinal axis of the hopper 510. In variations of the embodiments described herein, the size of the base and the axis of rotation of the base 520 could lie anywhere in the plane of the base 520 between a location that is coincident with the longitudinal axis of the hopper 510 and a location that lies laterally outside of the hopper 510 as shown in FIGS. 16 and 16A.

The base aperture(s) 522 may be in any suitable location on such a base 520. In the embodiment shown in FIGS. 16 and 16A, the base aperture 522 rotates about the center of rotation of the base 520 so that it is passes under the outfeed aperture 118 part of the time, and lies outside of the outfeed aperture 118 at other times during a complete rotation of the base 520.

Thus, while in some embodiments, the base aperture remains in particulate flow communication with the outfeed aperture, in this embodiment the base aperture 522 is in intermittent particulate flow communication with the outfeed aperture 518. In the particular embodiment shown in FIGS. 16 and 16A, the base aperture 522 is located such that during a revolution of the base, it will align with longitudinal axis of the hopper 510. In other embodiments, the base aperture need not align with longitudinal axis of the hopper 510 as long as it is in particulate flow communication with the outfeed aperture 518 at some point during rotation of the base 520. The arrow underneath the base 520 in FIG. 16 shows one example of a particle trajectory for such a feeder.

The embodiment shown in FIGS. 16 and 16A is believed to have the potential to provide several advantages. This embodiment may have the benefit of sending particles in a straight line trajectory rather than spinning radially from the disk. There is also a potential construction benefit as the motor 1010 can be placed directly at the center of the axis of rotation of the base 520, offset from the hopper 510.

Flow control of the particulate material is affected by altering the rotational speed of the base relative to the hopper. Although a range from about 0 rpm to about 2,000 rpm may be a typical range for conveyance of particulate material, speeds at or above 3,000 rpm can be achieved to more predictably alter the flow control of powders into a container. Such flow control may be especially advantageous if a mixture includes two or more varieties of particulates combined together for generally simultaneous conveyance (as used herein, "mixture" refers to combinations or blends of different particulates, as well as different particulates stacked upon one another within a hopper prior to release). Such flow control is also advantageous if layers of particulates are stacked upon one another for conveyance thereof in a predetermined order. Thus, the feeder of the present disclosure, in all of the embodiments shown, not only controls the flow rate of powders out of the hopper but also speeds up their flow by changing the rotational speed of the base aperture. This feature provides flexibility for particles of varying composition, crystallinity, morphology and microstructure.

Figure 8:
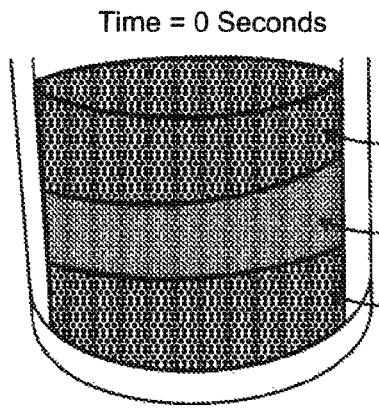
FIG. 8 is a schematic illustration of particulate material in a feeder of the type shown in FIG. 3 with a rotating base prior to the start of particulate material flow.
Figure 8A:
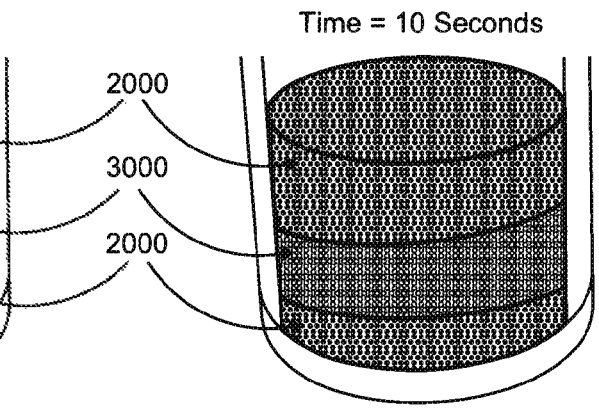
FIG. 8A is a schematic illustration showing the mass flow of particulate material in the feeder shown in FIG. 8 after 10 seconds after the start of flow.
Figure 8B:
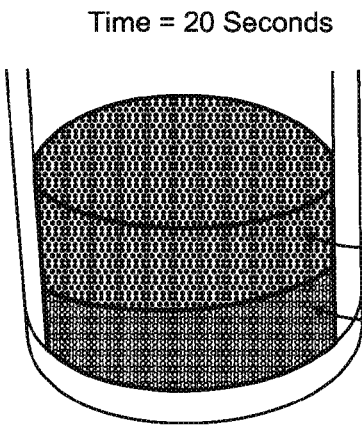
FIG. 8B is a schematic illustration showing the mass flow of particulate material in the feeder shown in FIG. 8 after 20 seconds after the start of flow.
Figure 8C:
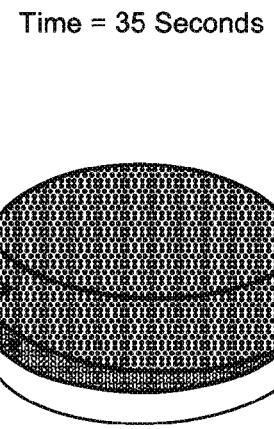
FIG. 8C is a schematic illustration showing the mass flow of particulate material in the feeder shown in FIG. 8 after 35 seconds after the start of flow.
Figure 8D:
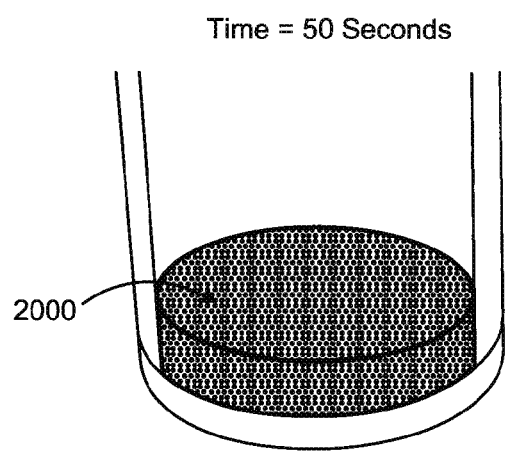
FIG. 8D is a schematic illustration showing the mass flow of particulate material in the feeder shown in FIG. 8 after 50 seconds after the start of flow.
Figure 9:
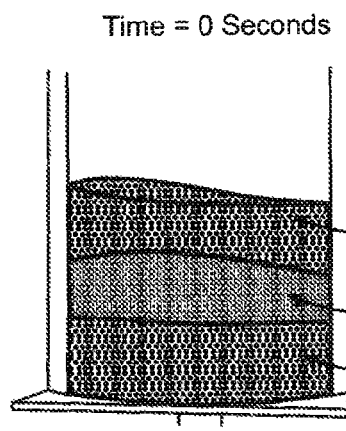
FIG. 9 is a schematic illustration of particulate material in a feeder of the type shown in FIG. 3 with a static base prior to the start of particulate material flow.
Figure 9A:
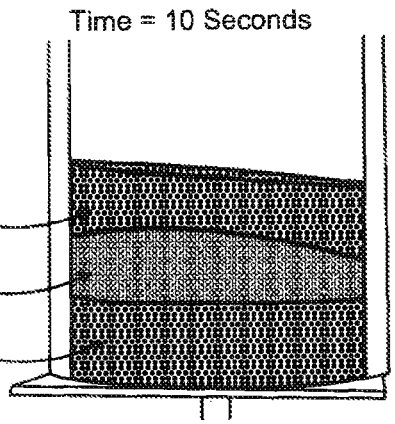
FIG. 9A is a schematic illustration showing the funnel flow of particulate material in the feeder shown in FIG. 9 after 10 seconds after the start of flow.
Figure 9B:
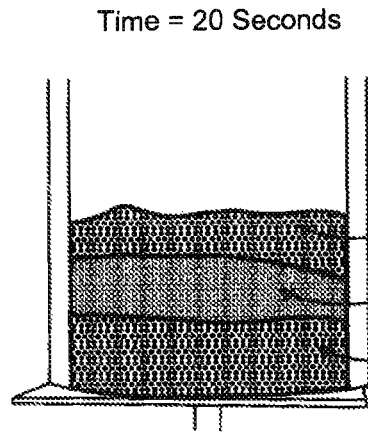
FIG. 9B is a schematic illustration showing the funnel flow of particulate material in the feeder shown in FIG. 9 after 20 seconds after the start of flow.
Figure 9C:
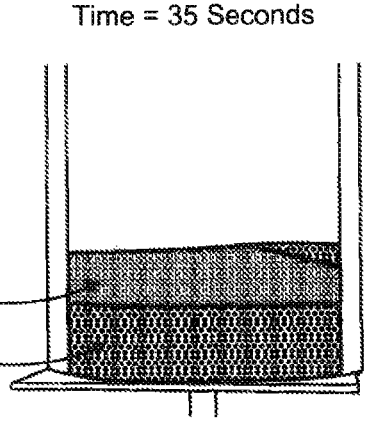
FIG. 9C is a schematic illustration showing the funnel flow of particulate material in the feeder shown in FIG. 9 after 35 seconds after the start of flow.
Figure 9D:
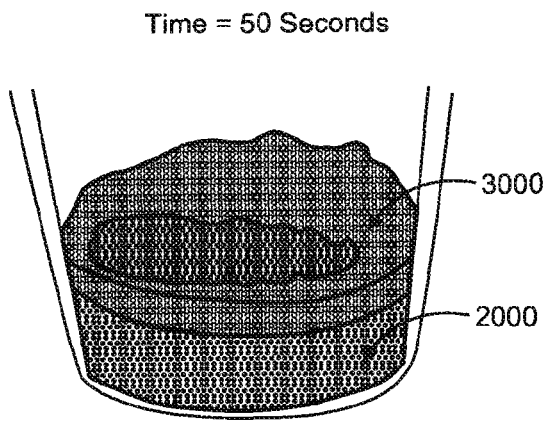
FIG. 9D is a schematic illustration showing the funnel flow of particulate material in the feeder shown in FIG. 9 after 50 seconds after the start of flow.

Examples of this flexibility are evident in FIGS. 8 to 9D, which provide time-based "snapshot" depictions of mass flow with a rotating base aperture and funnel flow with a static base aperture, respectively. FIGS. 8 to 9D show feeder configurations of the type shown in FIG. 3 described hereinabove. In both figures, three layers of particulates are provided, wherein the top and bottom layers comprise a first particulate 2000 and the middle layer comprises a second, different particulate 3000. In FIGS. 8 to 8D, a base having an aperture is rotating at or about 600 rpm in either a clockwise or counterclockwise direction. In FIGS. 9 to 9D, the base (and therefore the base aperture) remains static. As shown in FIGS. 8 and 9, for both the rotating and static base apertures, at time =0 seconds, both materials are stored in the hopper with definable boundaries between the bottom and middle layers and between the middle and top layers. At time=10 seconds, FIG. 8A shows the bottom layer of material 2000 being evenly distributed through the rotating base aperture, while FIG. 9A shows bottom layer of material 2000 beginning to flow. At time=20 seconds, FIG. 8B shows exhaustion of the bottom layer from the hopper and initiation of even distribution of material 3000. At this time, FIG. 9B shows top later of material 2000 beginning to flow through the static base aperture. At time=35 seconds, FIG. 8C shows material 3000 almost exhausted with a definable boundary between the middle and top layers, while FIG. 9C shows that material 3000 begins to flow with no discernible boundary between the middle and top layers. At time=50 seconds, FIG. 8D shows complete exhaustion of material 3000 and even distribution of the top layer of material 2000 through the rotating base aperture. At this time, FIG. 9D shows that material 3000 flows with the remainder of the top layer of material 2000 and a portion of the bottom layer of material 2000 in a characteristic funnel flow. Materials 2000 and 3000 are not fully exhausted from the hopper and are now blended in an uncertain combination.

In addition, it is possible to achieve a start-stop behavior with the presently disclosed feeder, particularly when the feeder is used for conveyance of cohesive materials such as flours and starches. Cohesive materials are particularly susceptible to arching behavior, whereby arches are formed at arbitrary intervals and have various forms and durations (e.g., they can be formed locally or over the entire area of the base aperture). Formation of an arch at least partially interrupts the flow because the arch carries the dynamic pressure of the material flowing above the arch. In some circumstances, the arch can become stable and the hopper clogged, with the chance of arch formation increasing as the ratio of aperture diameter to particle size decreases and as the cohesion and interlocking of particles increases. In the present disclosure, stationary disposition of the eccentrically disposed base aperture results in arching of cohesive materials so as to obstruct the flow thereof through the base aperture. Upon introduction of rotational movement of the base at a controlled speed, the cohesive material exhibits mass flow behavior through the base aperture for controlled conveyance of the material to a receptacle. In this manner, it is possible to simply halt rotation of the base and thereby halt material flow when a predetermined material volume in a receptacle is achieved. Such start-stop behavior beneficially realizes predictable dispensing of controlled material volumes so as to avoid mistakes in processing and further avoid costs incurred by inaccurate measurements of products. This benefit is realized without any exchange of parts and without additional machine maintenance. Thus, the feeder converts arching from a conventionally detrimental trait into an advantage for round-the-clock processes.

The present disclosure is successfully practiced with many classes of comminuted materials, including but not limited to fine powders, coarse powders and granules, cohesive materials and materials that tend to degrade when dormant for long time periods. The apparatus of this disclosure may be used for filling receptacles with powders such as flour, talcum, face powder, sugar, salts, resins, absorbent gelling material (AGM) granules and other types of comminuted materials. Almost any materials of a powdered and/or granular nature may be filled by the instant apparatus.

Now referring to FIGS. 10 through 15, data are provided that is obtained from a test apparatus to determine the performance characteristics of a feeder of the present disclosure. In the following examples, a generally cylindrical hopper such as the type shown in FIG. 3 is employed. In each example, the particulate material is disposed in a stationary hopper having an inner diameter of about 66 mm with a rotating base disposed adjacent an outfeed end of the hopper. A motor-driven driveshaft in communication with the base effects rotational movement of the base relative to the hopper. In each example, the rotating base has an aperture defined therethrough wherein the base aperture is disposed eccentrically of the base's axis of rotation. In each example, the dynamic range of material flow is readily identified as the ratio of the highest and lowest flow rates of a material.

Figure 10:
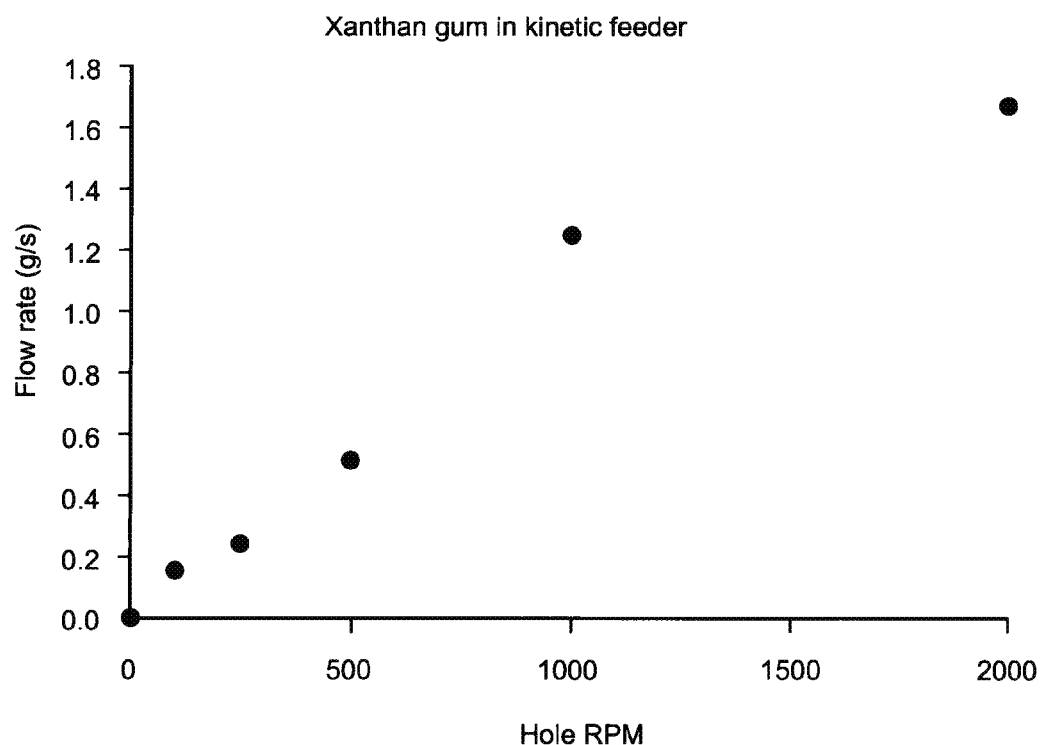
FIG. 10 is a graph showing the flow rate of Xanthan gum in a feeder as a function of revolutions per minute of the base.

With reference to FIG. 10, xanthan gum powder disposed in the hopper is subject to mass flow via a single base aperture having a diameter of about 20 mm (0.787"). The feeder configuration illustrated in FIG. 3 is used. Xanthan gum powder is a polysaccharide used to produce a large increase in the viscosity of a liquid. Xanthan gum powder is often used as a food additive to achieve thickness or stickiness. As the figure shows, increasing the rotational speed of the base accelerates the flow rate of the xanthan gum powder. Mass flow behavior is observed at all times during base rotation, and start/stop behavior is observed while the base is at rest.

Figure 11:
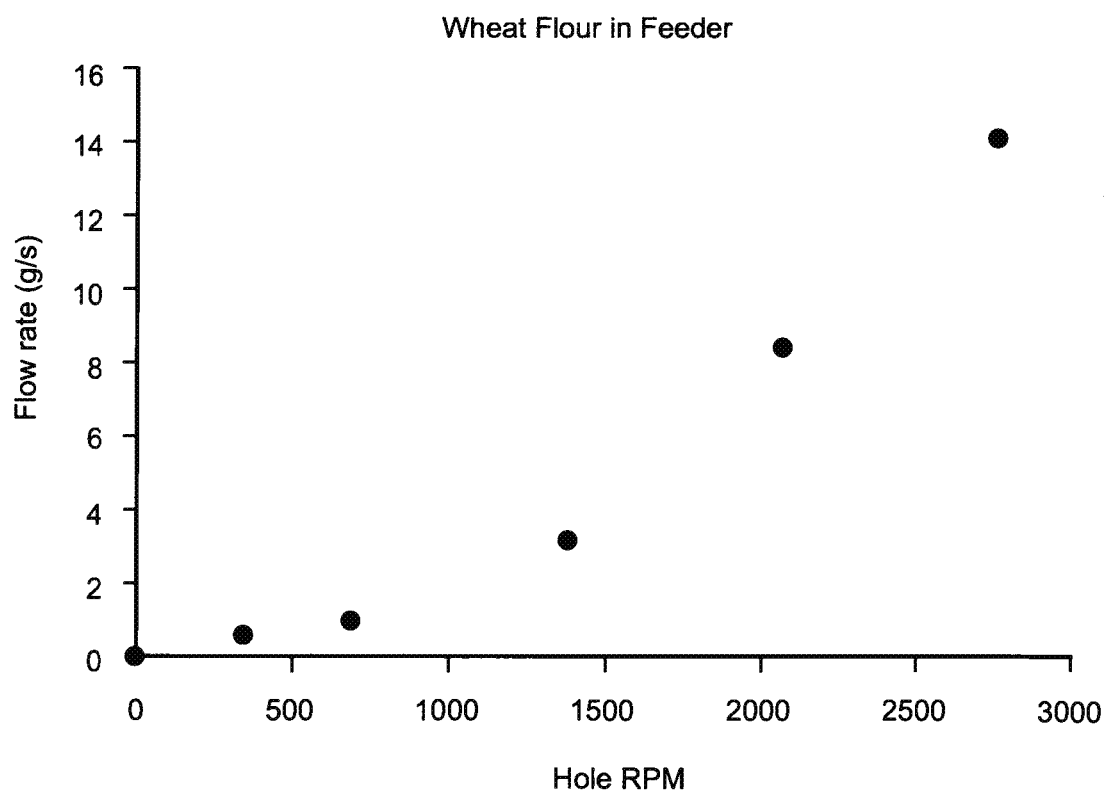
FIG. 11 is a graph showing the flow rate of wheat flour in a feeder as a function of revolutions per minute of the base.

With reference to FIG. 11, wheat flour is deposited into the hopper, and the base is provided with a single aperture having a diameter of about 20 mm (0.787"). The feeder configuration illustrated in FIG. 3 is used. Powders such as flour and starch have been known to be problematic when it comes to consistent flow through hoppers. Even hoppers designed correctly for a particular type of starch may be rendered useless as soon as the property of starch changes outside the design window. As illustrated, the powder flow is much more consistent, realizing a dynamic range of >25 that allows for extremely easy flow control. When the base is stationary (rpm=0), flow is readily reestablished upon rotational movement of the base aperture. In this example, mass flow behavior is observed at all times while the base is in motion.

Figure 12:
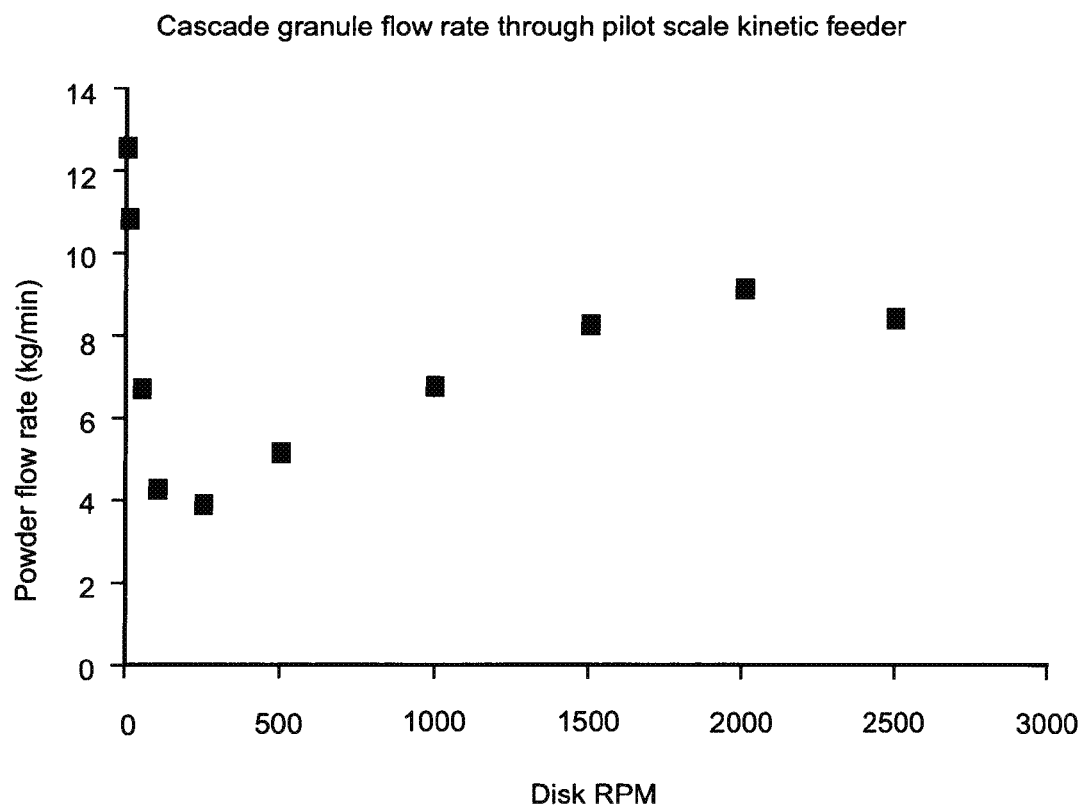
FIG. 12 is a graph showing the flow rate of CASCADE® dishwashing detergent granules in a feeder as a function of revolutions per minute of the base.

With reference to FIG. 12, detergent granules having a volume based median particle size of about 400-500 microns are placed in the hopper. The feeder configuration illustrated in FIG. 7 is used. The rotatable base includes a single aperture having a diameter of about 25.4 mm (1"). The detergent granules can include some fine powder (particle size below 100 microns) and coarse powder (particle size above 800 microns) resulting from agglomeration. Detergent granules can exhibit variances in cake strength depending on the desired flowability and granule stickiness desired to be obtained in the final detergent product. As the figure shows, the detergent granules unpredictably flow through the base aperture when the base is in an initial stationary position. As the base speed increases to about 2000 rpm, the powder flow rate first decreases and subsequently increases.

Figure 13:
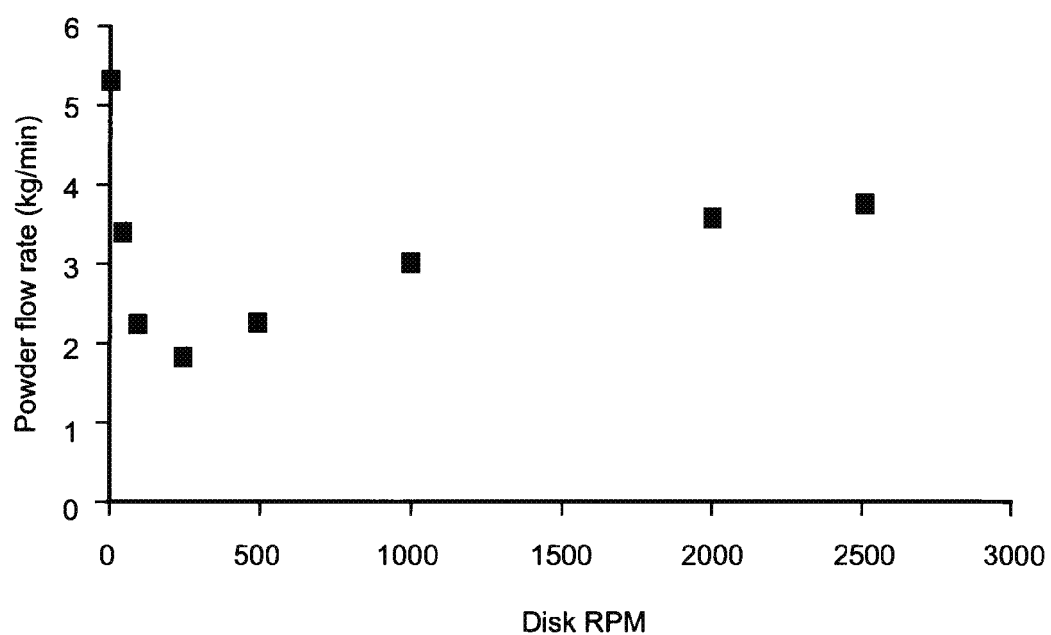
FIG. 13 is a graph showing the flow rate of absorbent gelling material granules in a feeder as a function of revolutions per minute of the base.

With reference to FIG. 13, absorbent gelling material (AGM) granules are deposited in the hopper. The feeder configuration illustrated in FIG. 7 is used. AGM granules include materials that are capable of absorbing and storing a high amount of liquid and may be used as granules of different particle size. The rotating base includes a single aperture having a diameter of about 25.4 mm (1"). As the figure shows, after an initial unpredictable flow of material through the base aperture while the base is stationary, a consistent volume flow of material is achieved as the speed of rotation approaches a range of about 2000 to 2500 rpm. Mass flow behavior is observed at all times during base rotation.

Figure 14:
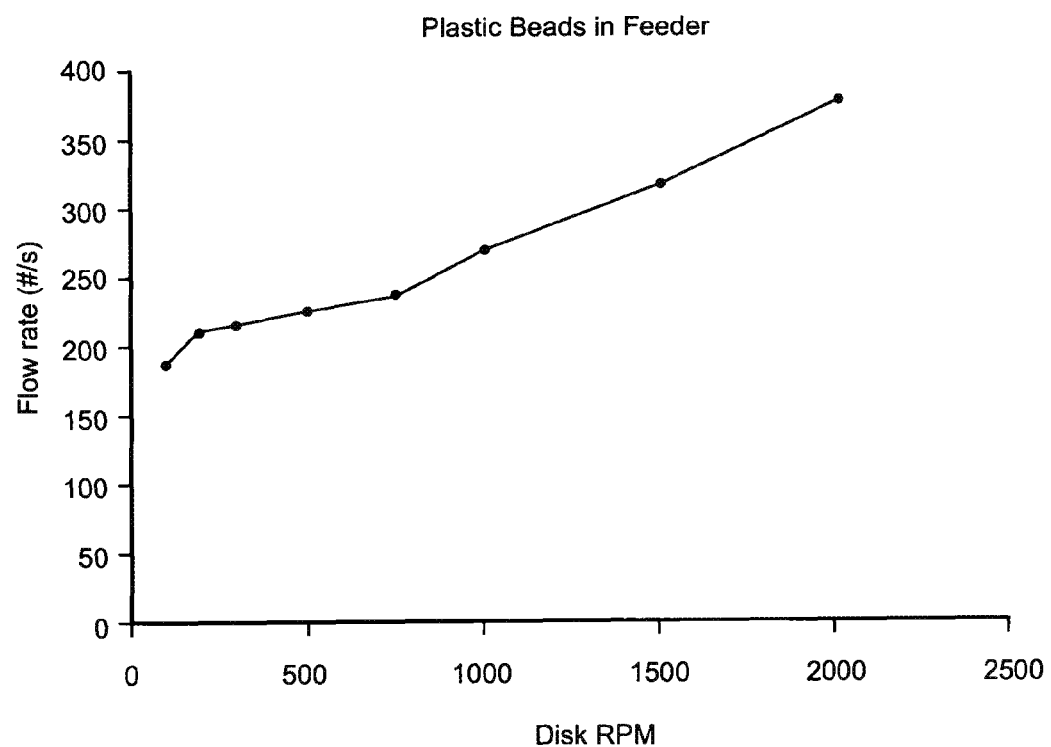
FIG. 14 is a graph showing the flow rate of plastic beads in a feeder as a function of revolutions per minute of the base.

With reference to FIG. 14, plastic beads having a uniform diameter of about 6 mm (0.236") were fed into the hopper. The feeder configuration of FIG. 3 is used. The base is provided with a single aperture having a diameter of about 20 mm (0.787"). The beads exert little frictional force on the interior wall of the hopper and thereby have an initially high flow through the base aperture even when the base assumes low rotational speed. As the base speed increases, the flow of beads through the base aperture increases generally linearly.

Figure 15:
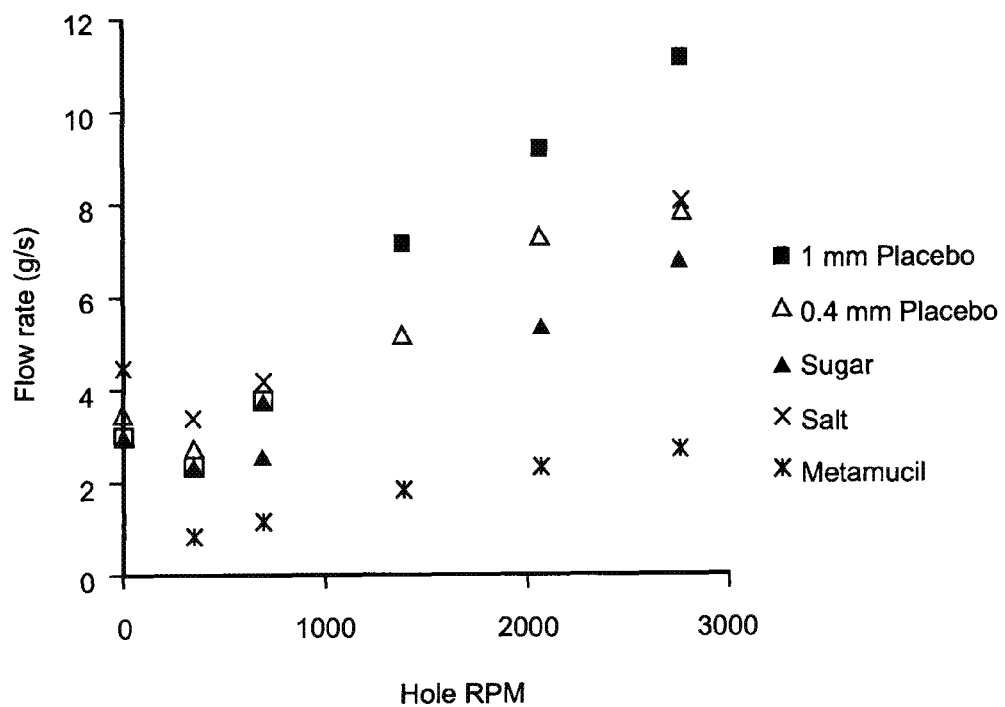
FIG. 15 is a graph showing the flow rate of various particulate materials in a feeder as a function of revolutions per minute of the base.

With reference to FIG. 15, the flow rates of various particle materials were observed as a function of the rotational speed of the base aperture. The feeder configuration of FIG. 3 is used. The base includes a single aperture having a diameter of about 6 mm (0.236") and the speed approached about 3000 rpm. A variety of particulates is disposed into the hopper one at a time (i.e., the materials were not mixed in any combination). Observed materials include placebo granules having median diameters of 1 mm, placebo granules having median diameters of 0.4 mm, granular additives such as sugar and salt, and a cohesive fiber additive designated by the mark METAMUCIL® ("METAMUCIL" is a registered trademark of Procter & Gamble, the assignee of the instant application). The dynamic range of material flow, defined as the ratio of the highest and lowest flow rates, varied with the material. For example, the 1 mm placebo showed a dynamic range of 4.7, whereas METAMUCIL® powder showed a dynamic range of 3.3. For each material, funnel flow through the base aperture is exhibited while the base remained stationary while mass flow is observed for the duration of the base's rotating movement.

In some embodiments, it is an unexpected benefit of the present disclosure that rotational movement of a base having an aperture defined therethrough imparts sufficient agitation to particulate materials (and particularly cohesive powders) to effect flow that is faster than that effected by gravity alone. To predict gravity-driven discharge from a hole at the bottom of a hopper, the mass discharged per unit time is given by the Beverloo equation:

$$W = C \rho_b g^{1/2} (D-kd)^{5/2}$$

where $\rho_b$ is the density of the bulk granular medium, $g=980$ cm/s$^2$, D is the diameter of the base aperture, d is the grain diameter, and C and k are dimensionless fitting parameters. Typical ranges for the numerical constants are $0.5<C<0.7$ and $1.2<k<3$, depending on grain shape and friction. The Beverloo equation implies the existence of a threshold aperture diameter, kd, of a few grains across, below which the flux vanishes. Just above this threshold, the flow is subject to intermittent clogging. Even far above threshold, the response may not be steady in that the Beverloo form is often interpreted in terms of intermittent formation and breakup of arches across the hole.

The presently disclosed feeder, by realizing consistent and uniform material delivery over the entire area of a hopper outfeed port, exhibits the benefits of a flow-aid device and a reliable and predictable particulate feeder. In conventional feeders, the flow profile of hoppers is such that the particulate material that is first to enter the hopper is not necessarily the first material to leave the hopper. The presently disclosed feeder, in some embodiments, overcomes this flow behavior by utilizing rotational motion proximate an outfeed end of a feed hopper to achieve both flow control and a mass flow regime during discharge of the material. Caking, spoilage and oxidation of bulk material are ameliorated due to the first-in first out pattern achieved by the feeder, and segregation is minimized for the same reason.

The presently disclosed feeder preserves unobstructed movement of particulate material in a hopper and further ensures granule integrity upon distribution to a receptacle for further processing. The rate of flow of powders through the base aperture can be faster than through static apertures of like dimensions. Yet the material is continuously withdrawn at predictable rates along a common travel path. Therefore, the material in the hopper will remain in motion until exhausted from the hopper. Such material movement provides the feeder with enhanced accuracy of distribution of particulate material to a receptacle. Such characteristics are particularly beneficial to dosing applications in which the precision of ingredient measurements is critical.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for effecting flow conveyance of particulate material from a hopper, said apparatus comprising:
   a hopper that facilitates receipt and storage of said particulate material, said hopper having a longitudinal axis, a wall, an infeed end for receipt of said particulate material in said hopper and an outfeed end for conveyance of said particulate material from said hopper, wherein said longitudinal axis extends between said infeed end and said outfeed end, and said hopper has an outfeed aperture at said outfeed end; and
   a base disposed proximate said outfeed end wherein at least a portion of said base is coextensive with said outfeed aperture, and said base has at least one base aperture defined therethrough to facilitate said conveyance of said particulate material from said hopper, wherein the movement of particulate material is unobstructed in said hopper;
   wherein at least one of said base and said hopper is rotatable relative to the other of said base and said hopper through multiple revolutions, wherein said rotation is effected relative to an axis of rotation that is parallel to said longitudinal axis of said hopper, such that said base aperture is at least in intermittent particulate flow communication with said outfeed aperture, and apparatus is configured so that said rotation is at a speed in which particulate material flows through said outfeed aperture faster than it would flow by gravity alone.

2. The apparatus of claim 1, wherein said outfeed end includes one of a frustoconical portion and a conical portion having said outfeed aperture delineating a terminus thereof.

3. The apparatus of claim 1, wherein said wall comprises one of a cylindrical geometry and a conical geometry.

4. The apparatus of claim 1, wherein said at least one base aperture is selected from a cylindrical geometry, an elliptical geometry and any combination thereof.

5. The apparatus of claim 4, wherein said at least one base aperture includes at least a pair of apertures.

6. The apparatus of claim 1, wherein said at least one base aperture is eccentrically disposed relative to said longitudinal axis of said hopper.

7. The apparatus of claim 6, wherein said at least one base aperture is disposed proximate said edge of said base.

8. The apparatus of claim 7, wherein said at least one base aperture is substantially sector shaped with an arc at or close to said edge of said base.

9. The apparatus of claim 1, wherein said at least one base aperture is concentrically disposed relative to said base.

10. The apparatus of claim 1 wherein said rotation is effected by an actuator in operable communication with at least one of said hopper and said base.

11. The apparatus of claim 10, wherein said actuator comprises at least one motor connected to a driveshaft.

12. The apparatus of claim 10, wherein the base is rotatable adjacent said outfeed end.

13. The apparatus of claim 1, wherein said outfeed end is rotatable relative to at least one of said wall and said base.

14. The apparatus of claim 11, wherein at least one of said base and said hopper is rotatable at speeds from above 0 rpm to about 3,000 rpm.

15. The apparatus of claim 11, wherein at least one of said base and said hopper is rotatable at speeds between about 2,000 rpm to about 2,500 rpm.

16. A method for conveying particulate material from a hopper, said method comprising the steps of:
   a. providing an apparatus comprising:
      a hopper having a longitudinal axis, a wall, an infeed end for receipt of particulate material in said hopper, and an outfeed end for conveyance of particulate material from said hopper, wherein said longitudinal axis extends between said infeed end and said outfeed end, and said hopper has an outfeed aperture at said outfeed end; and
      a base disposed proximate said outfeed end of said hopper wherein at least a portion of said base is coextensive with said outfeed aperture, and said base has at least one base aperture defined therethrough to facilitate said conveyance of said particulate material from said hopper; and
   b. placing particulate material in said hopper; and
   c. rotating at least one of said base and said hopper relative to the other of said base and said hopper through multiple revolutions, wherein said rotation is effected relative to an axis of rotation that is parallel to said longitudinal axis of said hopper, such that said base aperture is at least in intermittent particulate flow communication with said outfeed aperture, and said rotation is at a speed in which particulate material flows through said outfeed aperture faster than it would flow by gravity alone.

17. The method of claim 16, wherein at least one of said base and said hopper is rotated at speeds from above 0 rpm to about 3,000 rpm.

18. The method of claim 16, wherein at least one of said base and said hopper is rotated at speeds between about 2,000 rpm to about 2,500 rpm.

19. The method of claim 16, wherein the rate of flow of said particulate material from said outfeed aperture is increased or decreased by rotating the base or hopper at various speeds.

20. The method of claim 16, wherein the rotation is carried out at a speed so that the particulate material moves in said apparatus by mass flow wherein all of the particulate material in said hopper is in motion, including particulate material located along the hopper wall.

21. The method of claim 16, wherein the rotation is carried out at a speed so that the particulate material moves in said apparatus by mass flow wherein particulate flow through said base aperture assumes a first-in first-out behavior.

22. The method of claim 16 wherein said hopper is rotated relative to said base.

* * * * *